Feb. 13, 1968
F. L. KIRKHAM
3,368,265
MEANS FOR AUTOMATICALLY INDEXING
AND REPLACING CUTTER INSERTS
Filed Jan. 12, 1966
3 Sheets-Sheet 1
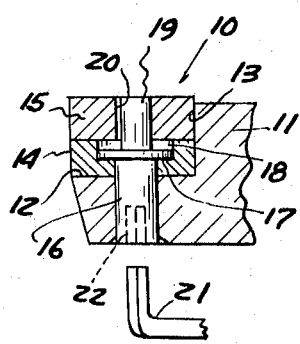
FIG. 1
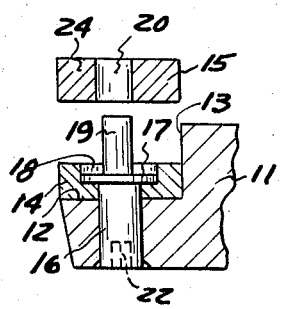
FIG. 2
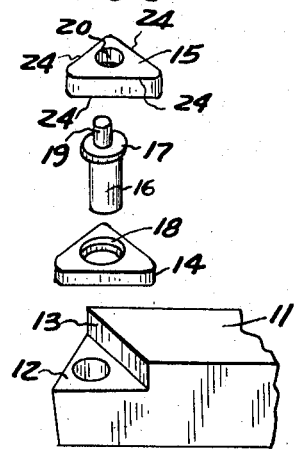
FIG. 3
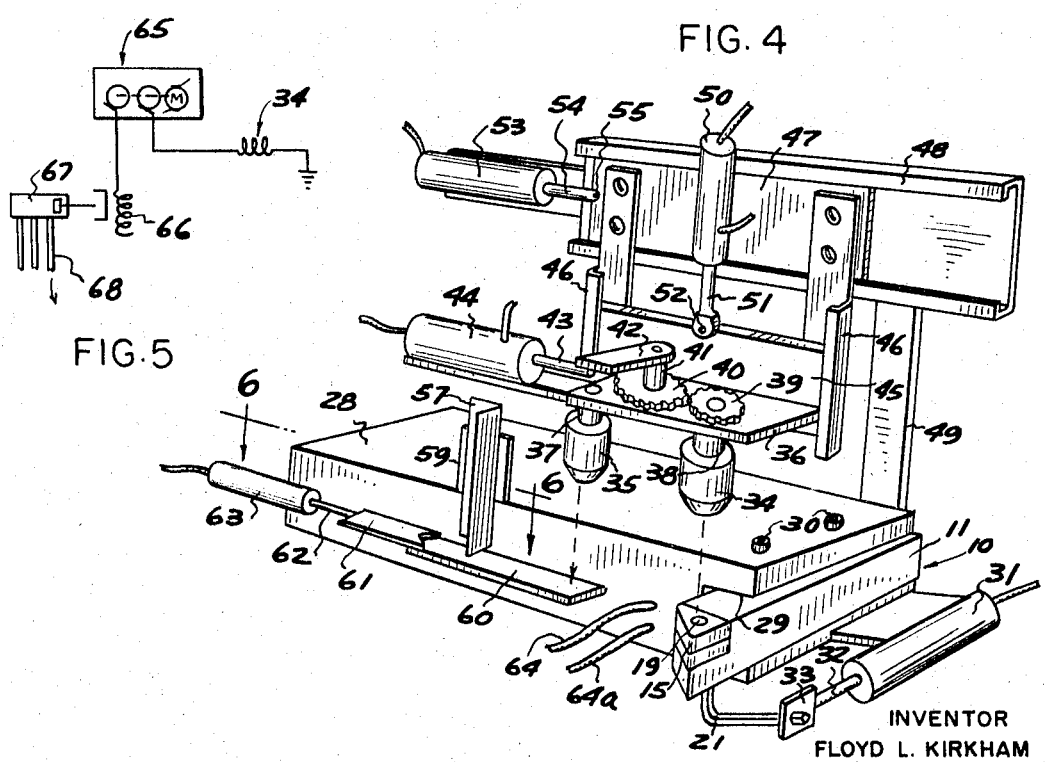
FIG. 4
FIG. 5
INVENTOR
FLOYD L. KIRKHAM
BY *Harold J. Holt*
ATTORNEY

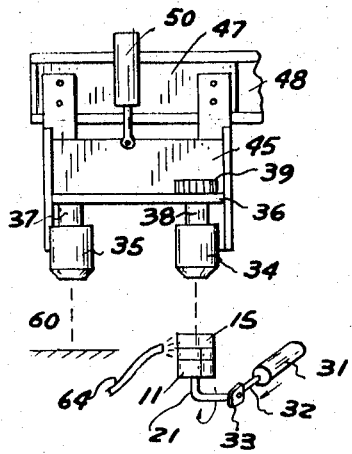
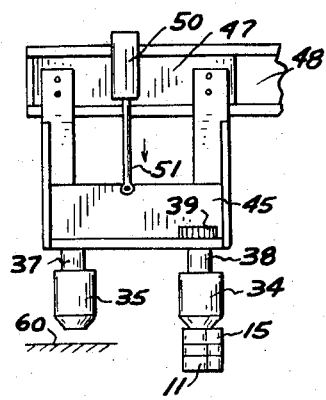
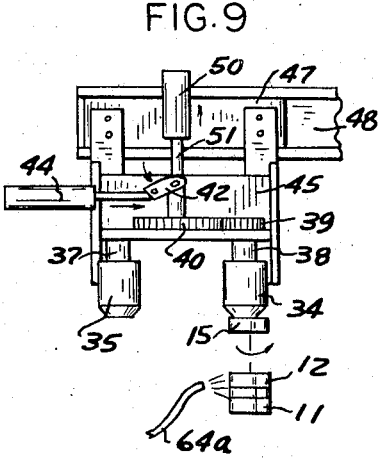
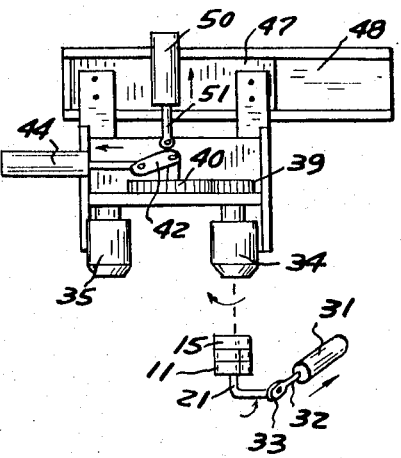
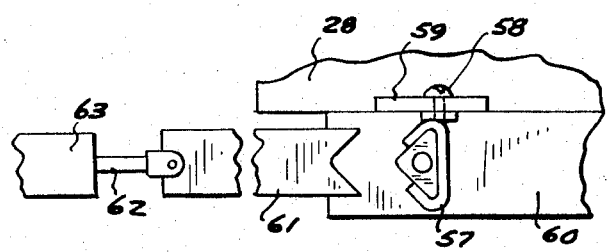

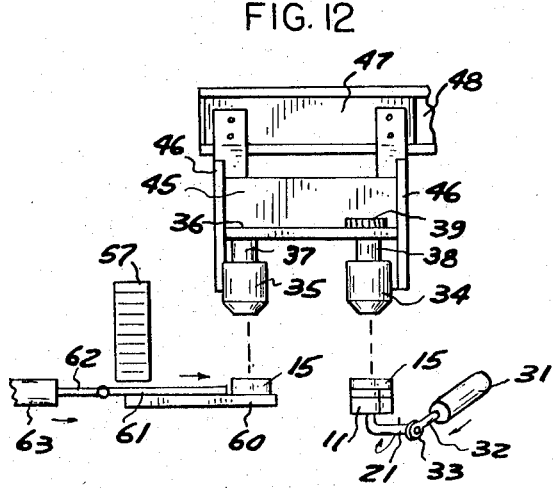
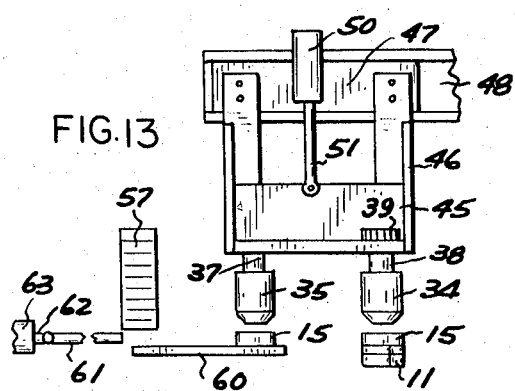
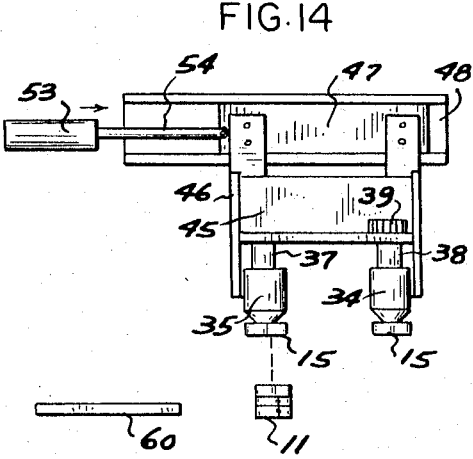
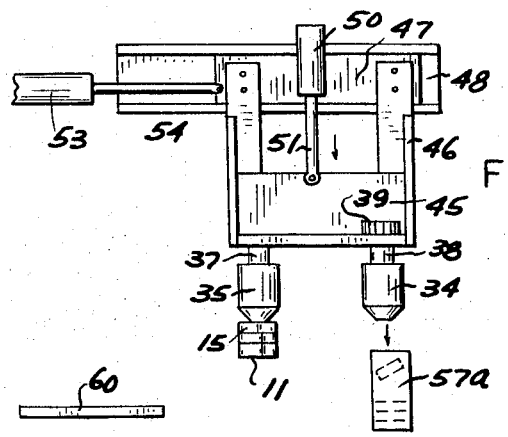
INVENTOR
FLOYD L. KIRKHAM

United States Patent Office 3,368,265
Patented Feb. 13, 1968

3,368,265
MEANS FOR AUTOMATICALLY INDEXING AND REPLACING CUTTER INSERTS
Floyd L. Kirkham, St. Clair Shores, Mich., assignor to General Electric Company, a corporation of New York
Filed Jan. 12, 1966, Ser. No. 520,233
7 Claims. (Cl. 29—200)

This invention relates to a means for indexing and replacing toolholder cutter inserts.

Cutting tools, used in metal cutting machines such as lathes and the like, are frequently formed with a removable and replaceable cutter insert made of a hard material, such as a carbide mounted upon a toolholder. Such cutter inserts are formed with a number of cutting edges, so that when one edge becomes worn, the insert may be removed from its toolholder and then indexed to present a new cutting edge. After all the edges of each insert are worn, the insert is replaced.

Until now, both the indexing of such cutter inserts and the replacement thereof required manual manipulation involving unlocking the insert from its toolholder, rotating or replacing it and thereafter relocking it. Such manipulations not only are time-consuming, but also are difficult to perform because the inserts are sometimes hot and in addition are relatively small and difficult to grasp and handle, particularly by a machinist whose hands may be slippery due to oil or grease.

Thus, it is an object of this invention to provide a mechanism for automatically indexing cutter inserts and for replacing same when they become worn, with a minimum of time and with complete elimination of manual manipulation.

A further object of this invention is to provide a means for automatically indexing and replacing cutter inserts which is compact and relatively simple in construction, which may be removably mounted upon a machine tool, and which is capable of enduring the vibrations, movements, speed and pressure of the machine tool.

These and other objects and advantages of this invention will become apparent upon reading the following descriptions, of which the attached drawings form a part.

In these drawings:

FIGURE 1 shows a cross-sectional view of the cutter insert end of a cutting tool, and FIGURE 2 is a view similar to FIG. 1 but with the cutter insert removed.

FIGURE 3 is a perspective, disassembled view of the parts comprising the cutting tool.

FIGURE 4 is a perspective view of the means for indexing and replacing the toolholder cutter inserts.

FIGURE 5 is a simplified, schematic view of the control circuit.

FIGURE 6 is an enlarged, plan view taken in the direction of arrows 6—6 of FIG. 4.

FIGURES 7–11 are schematic diagrams showing five successive steps in the indexing cycle, and FIGURES 12–15 are schematic diagrams showing four successive steps in the replacement cycle.

*The cutter insert*

FIGS. 1–3 illustrate a cutting tool 10 which comprises an elongated toolholder 11 having a forward end recess 12 which forms an upwardly opening seat with an end shoulder 13. A cutter seat 14 rests upon the recessed bottom and upon that is placed the cutter insert 15.

The cutter insert 15 is mechanically locked to the toolholder by means of a rotatable cam pin 16 extending downwardly through the toolholder and having a collar 17 fitted within a socket 18 formed in the cutter seat 14. An integral, eccentric cam 19 extends upwardly through a central hole 20 formed in the cutter insert.

The pressure of the cam within the hole 20 forces one side of the insert against the end shoulder 13 of the toolholder to lock it in place. Locking and unlocking the cutter insert is accomplished by rotating the cam pin 16 a quarter turn or less by means of a conventional socket wrench 21 fitted into a socket 22 formed in the lower end of the cam pin.

The cutter insert, which is formed of a carbide or other suitable hard cutting material, is in the shape of a thin wafer having a number of cutting edges 24 due to its round, triangular, square or other equal length sides geometric form. The cutting edges are formed along its top surface as well as along its bottom surface.

The above construction is similar to that disclosed in U.S. Patent No. 3,187,406 of June 8, 1965. The specific locking means may be varied, but it is important to the invention herein that the cutter insert is formed of a number of cutting edges and that it is removably and mechanically locked to the toolholder. It is preferable that the locking means be generally below the cutting edge so that it does not obstruct the upper surface of the insert.

Normally, the above-described cutting tool 10 is fastened to the carriage of a lathe or other similar type of cutting machine so that the insert makes contact with and cuts a workpiece until such time as its cutting edge is worn, at which time the edge must be replaced by another edge or by a new insert when all the edges are worn.

*Apparatus for indexing and replacing inserts*

Instead of securing the toolholder 11 to the carriage of the lathe or similar machine by conventional means, a tool block 28 is used (see FIG. 4). Such tool block is fastened to the carriage so as to locate the cutter insert at its proper position for cutting the workpiece.

Thus, as shown in FIG. 4, the tool block is formed with an end channel 29 which receives the toolholder 11. Suitable set screws 30, or the like, fasten the toolholder to the tool block. Bolts (not illustrated) may be used to fasten the block to the carriage of the lathe, whose construction, being conventional, is not illustrated here.

In conventional practice, the machine operator manually inserts an Allen wrench 21 into the cam pin socket 22 when needed to lock or unlock the insert relative to the toolholder. This is frequently difficult and time-consuming as the socket may be relatively inaccessible or out of sight, or both. However, in the construction of the invention, the Allen wrench 21 is permanently placed within the socket 22 and it is rotated through the action of a pneumatic cylinder 31 having a piston rod 32 terminating in a centrally apertured connector 33 which receives the free end of the Allen wrench. Thus, upon actuation of cylinder 31, movement of its piston rod 32 causes the Allen wrench to swing in one direction or another for locking or unlocking the insert. An advantage of the invention is that movement of cylinder 31 and rod 32 may be adjusted so that Allen wrench 21 always holds the cam pin in locking position under pressure so that the insert cannot work loose. The latter has frequently been a problem in the past.

Located above the insert is a pair of electromagnetic grippers 34 and 35. Gripper 34 functions as an indexing gripper and is in direct vertical alignment with the central axis of the insert. Gripper 35 is offset and parallel to gripper 34 and functions as a replacement gripper.

Griper 35 is rigidly secured to a horizontal support plate 36 by means of a shaft 37, while gripper 34 is rotatably secured to the plate 36 by rotatable shaft 38 upon which a small driven gear 39 is secured.

Meshed with gear 39 is a drive gear 40 which is rotatably mounted upon the plate 36 and has a stub shaft 41, to which is connected a line 42, in turn connected to a piston rod 43 of an air cylinder 44. Operation of the air cylinder 44 causes movement of its piston rod 43 and link 42 to thus rotate gear 40, along with gear 39, a predetermined number of degrees, such as one-third of a revolution for a triangular insert. This, in turn, rotates the indexing gripper 34 to the same extent.

The horizontal support plate 36 is secured to a vertically slidable support plate 45 which is supported and guided for vertical movement within guide tracks 46, whose upper ends are rigidly secured to a horizontal slider plate 47. Plate 47 is horizontally guided and supported with a guide track 48 which is secured to the tool block 28 by means of a column 49.

Vertical movement of the slidable plate 45 is accomplished through an air cylinder 50, whose piston rod 51 is connected at 52 to such plate. Horizontal sliding of slider plate 47 is effected through an air cylinder 53, whose piston rod 54 is connected at 55 to such plate. Thus, the grippers 34 and 35 may be moved upwardly and downwardly in response to actuation of the cylinder 50 and may be moved horizontally sideways by means of actuation of the cylinder 53.

A magazine 57 (see FIG. 6) is removably mounted upon the tool block 28 by means of screws 58 or the like attached to a mounting lug 59 secured to the block. The magazine is initially filled with a stack of fresh cutter inserts. The open lower end of the magazine is spaced a short distance above a slide or track 60 so that the lowest insert drops by gravity upon the track. That insert is then moved when needed by means of a pusher 61 having a notched end corresponding in shape to the external shape of the insert, to a point directly beneath the replacement gripper 35. Movement of the pusher 61 is effected by operation of an air cylinder 63 having its piston rod 62 connected to the pusher.

Also mounted upon the tool block are compressed air lines 64 and 64a which open at the forward end of the cutting tool 10 for blowing compressed air across the insert and seat at certain predetermined times as described below.

FIG. 5 schematically illustrates a portion of the controls used to actuate and cycle the above-described mechanism. These controls basically consist of a conventional timer mechanism 65 which may be formed, for example, of a motor-driven shaft upon which are mounted a number of cams. Such cams selectively operate switches to actuate solenoid relays 66 which in turn operate selected air valves 68, of a large group of air valves, to thus operate the various air cylinders as desired. In addition, one of the timer cams operates the electromagnetic gripper 34. The particular control mechanism used may vary considerably depending upon the need, and since the parts thereof are conventional, no further description is given here.

The control may be initially actuated by either a clock type of switch which turns on after the passage of a predetermined amount of time, or alternatively, it may be operated by a counter mechanism which operates after a predetermined number of cuts are made upon a workpiece, or it may be operated by a sensing device which senses the condition of the specific cutting edge then being used. However, once actuated, the timing mechanism 65 cycles the apparatus for either indexing or replacing the insert 15 in a manner described below.

Indexing sequence

The indexing sequence is schematically shown in FIGS. 7 through 11. When the first cutting edge 24 of the insert becomes worn, the timer 65 automatically goes through its indexing cycle. Thus (see FIG. 7), the air valve which controls cylinder 31 operates, causing piston rod 32 to move forwardly to turn the Allen wrench 21, thus unlocking the insert. At the same time, compressed air is forced through tube 64 to blow over the upper surface of the insert and clear if of foreign materials, such as chips and the like. Then the air blast is shut off and cylinder 50 is actuated (see FIG. 8), causing the vertical support plate 45 to move downwardly to position the indexing gripper 34 in direct contact with the upper surface of the insert. At the same time, the electromagnets are energized and gripper 34 magnetically grips and holds the insert.

Next (see FIG. 9), air cylinder 50 is retracted to raise the grippers upwardly and air cylinder 44 is operated to rotate drive gear 40 and driven gear 39, thereby rotating the indexing gripper 34 a predetermined number of degrees, such as 120 degrees for a triangular shaped insert. At the same time, compressed air is again forced through tube 64a to clear the top surface of the seat of the toolholder of foreign material.

Next (see FIG. 10), air cylinder 50 is again actuated to lower the grippers thereby replacing the insert upon the seat, but in its indexed position. The electromagnets are then de-energized to release insert 15 from gripper 34.

While air cylinder 50 remains actuated to hold the insert firmly against the seat, cylinder 31 is actuated to turn the Allen wrench and again lock the insert in place, the cylinder maintaining pressure on the Allen wrench to keep the insert firmly locked in place. Then (see FIG. 11), air cylinder 50 retracts its piston rod to raise the grippers, while at the same time air cylinder 44 retracts to its normal position to revolve indexing gripper 34 back to its original position.

At the completion of this cycle, the apparatus becomes inoperative and cutting is resumed with the newly presented cutting edge 24.

The above indexing cycle is repeated until all of the cutting edges upon one surface of the insert are used.

Replacement sequence

After all three of the cutting edges on the upper surface of the insert are used up or worn, the insert is replaced with a fresh cutter insert. The replacement cycle is illustrated in FIGS. 12–15. Here, the timer 65 cycles the replacement sequence which comprises (see FIG. 12) actuating cylinder 31 to unlock the insert located upon the toolholder, while at the same time actuating cylinder 63 to extend and slide the pusher 61. This moves the lowermost fresh insert, which is rested upon slide 60, directly beneath the replacement gripper 35. Next, compressed air is forced through tube 64 to clear off the surface of the insert to remove chips and foreign material. At the same time, actuation of cylinder 50 (see FIG. 13) lowers the grippers to the point where the indexing gripper 34 is in contact with and magnetically grips the insert which is worn, while the replacement gripper 35 magnetically grips the fresh insert.

Thereafter, cylinder 50 moves plate 45 up and horizontally operating cylinder 53 moves the horizontal slider plate 47 to the right (see FIG. 14) to align the replacement gripper with the toolholder seat. At the same time, compressed air is forced through tube 64a to clear off the top of the seat.

Then (see FIG. 15), cylinder 50 is again actuated to lower the grippers to the point where the replacement gripper places its fresh insert upon the toolholder seat while the indexing gripper is arranged above an empty magazine 57a so that when the electromagnets are de-energized, the fresh insert remains upon the toolholder while the used insert drops into the magazine with its worn edges up and its still unused lower surface edges down. The cycle then completes itself to return the grippers to their normal position (FIG. 12) and to lock the replacement insert upon the toolholder for further cutting.

After all of the inserts have been replaced, the magazine 57a may be removed from its support, turned upside down, and then secured to the block in place of the now-empty magazine 57 so that the inserts stacked therein may be used over again, but this time on their unused edges. Once all of the inserts have been used, top and bottom, they are normally discarded as scrap.

*Conclusion*

It can be seen that the cycling sequences may be very rapidly effected, so as to either index or replace the insert between cuts of the machine tool, without any need for manual manipulation.

The physical construction of the device may be varied within the scope of the invention, such as, for example, utilizing hydraulic controls and hydraulically actuated cylinders in place of those described above, etc. Thus, the foregoing description should be read as being illustrative of one operative embodiment of this invention and not in a strictly limited sense.

What I claim as new and desire to secure by Letters Patent of the United States is:

1. Means for indexing and replacing toolholder cutter inserts releasably secured to a toolholder comprising:
   insert release means for controlling the release of the insert from the toolholder;
   a vertically movable support having an insert gripper mounted thereon and normally disposed a short distance above the toolholder mounted cutter insert, said insert gripper being mounted for rotation about a vertical axis, aligned with the center of the insert, said gripper having means for releasably gripping and holding the insert;
   power means for raising and lowering said gripper for thereby lowering said gripper into contact with said insert and raising said gripper to remove the insert from the toolholder;
   and rotation means for rotating said gripper, with the insert, a predetermined number of degrees to thereby place a new cutting edge of the insert into cutting position;
   a control for sequentially actuating said insert release means to initiate release of the cutter from the toolholder, then operating said power means for moving said gripper downwardly into contact with said cutter insert and for operating said gripper means to grip said cutter insert and thereafter operating said power means to raise said gripper and operate said rotation means to rotate said gripper, and again operating said power means to lower said gripper for replacing the cutter insert in the toolholder, then operating said insert release means to initiate locking of the insert to the toolholder, and finally raising said gripper to its normal position.

2. Means for indexing and replacing toolholder cutter inserts, comprising:
   a substantially horizontally arranged toolholder having a forward end with an upwardly opening recess formed thereon;
   a cutter insert having a number of interchangeable cutting edges formed upon its upper surface, rested in said recess;
   releasable locking means normally securing said cutter insert upon said toolholder;
   a vertically movable support having an insert indexing gripper normally arranged a short distance above said cutter insert and its seat, said gripper being rotatably mounted upon said support for rotation about a vertical axis aligned with the center of said cutter insert, and said gripper having means for releasably gripping against and holding the upper surface only of the cutter insert;
   power means for raising and lowering said gripper for thereby lowering said gripper into contact with said cutter insert and raising the gripper with the cutter insert above said seat;
   and rotation means for rotating said gripper, with the cutter insert, a predetermined number of degrees to thereby turn the cutter insert for replacing one cutting edge with its next adjacent cutting edge;
   a control for sequentially actuating the releasable locking means to thereby release the cutter insert from its tool holder, then operating said power means for moving the gripper downwardly into contact with said cutter insert and for operating said gripper means to grip said cutter insert and thereafter operating said power means to raise said gripper and operate said rotation means to rotate said gripper, and again operating said power means to lower said gripper for replacing said cutter insert upon its seat and operating said locking means for securing the cutter insert to the toolholder and finally raising the gripper to its normal position.

3. A construction as defined in claim 2, and including a second replacement gripper having a releasable gripping means, secured to said support adjacent to and parallel to said first-mentioned indexing gripper;
   said support being horizontally movable, for selectively aligning said replacement gripper with said seat and also being verticaly movable by said power means for raising and lowering both grippers simultaneously;
   means for positioning a replacement cutter insert beneath and in contact with the replacement gripper at the time that the indexing gripper contacts the first-mentioned cutter insert after complete angular rotation thereof, that is, after all of its cutting edges have been used;
   and means for horizontally moving said support prior to next lowering the support for thereby replacing the replacement cutter insert upon said seat.

4. A construction as defined in claim 3, and wherein said grippers comprise electromagnets, each having electrical energizing means for magnetically, releasably gripping and holding said cutter inserts.

5. A construction as defined in claim 3, and said means for positioning a replacement cutter insert comprising:
   a slide having an end arranged beneath the replacement gripper and a removable magazine arranged above the slide and containing a stack of cutter inserts, said magazine having an open lower end for gravity dropping inserts one by one upon the slide;
   a power means for pushing the cutter insert then located upon the slide, along the slide and under the replacement gripper;
   a second, removable magazine arranged to receive, in a stack, the cutter inserts removed from the seat by the indexing gripper after all their cutting edges have been used;
   said cutter inserts having cutting edges formed upon their lower surfaces as well as upon their upper surfaces, and said second magazine being invertible for being interchanged with the first magazine when it is empty, to thus provide a new stack of fresh cutter inserts with the unused lower cutter edges arranged upwardly for replacement through the magazine.

6. A construction as defined in claim 2, and said cutter insert releasable locking means comprising:

a rotatable cam received within a central opening formed in the insert cutter and having an integral pin portion extending downwardly through the seat and toolholder;

means located beneath the toolholder for rotating said pin portion and said cam for locking and unlocking the cutter insert relative to the toolholder.

7. A construction as defined in claim 2, and including airblast means controlled by said control to blow a blast of compressed air over the upper surface of said cutter insert just before contact with said gripper and then to again blow a blast of compressed air over the seat prior to replacement of the cutter insert upon the seat for automatically cleaning same of foreign material.

References Cited

UNITED STATES PATENTS

| | | | |
|---|---|---|---|
| 2,540,836 | 2/1951 | Seybold | 29—200 |
| 3,293,734 | 12/1966 | Buckley | 29—200 |
| 3,309,765 | 3/1967 | Kirsten | 29—401 |

THOMAS H. EAGER, *Primary Examiner.*